MULTIPHASE GENERATOR

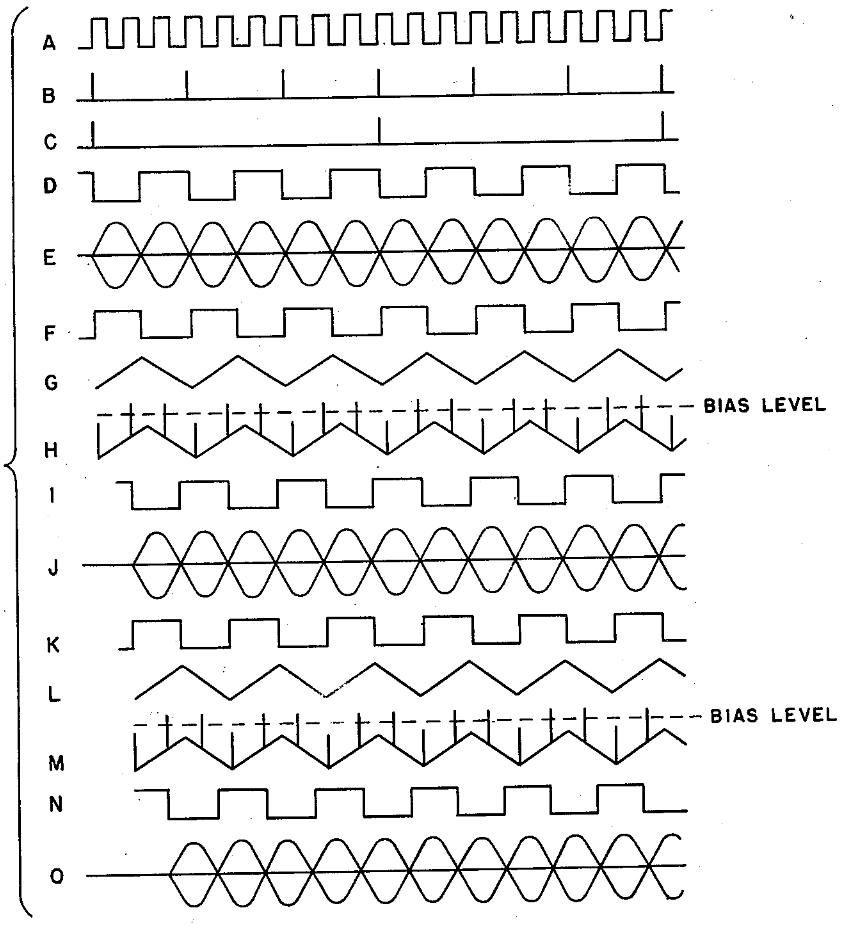
FIG. 3
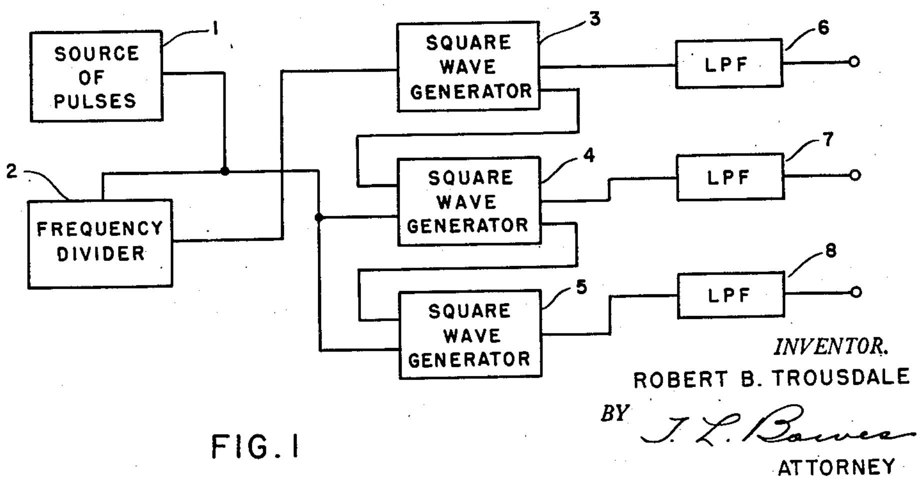
FIG. I
INVENTOR.
ROBERT B. TROUSDALE
BY T. L. Bowes
ATTORNEY Sept. 11, 1951 R. B. TROUSDALE 2,567,410

Filed Jan. 11, 1949 2 Sheets-Sheet 2

INVENTOR.
ROBERT B. TROUSDALE
BY T. L. Bowes
ATTORNEY

Patented Sept. 11, 1951

2,567,410

UNITED STATES PATENT OFFICE 2,567,410

MULTIPHASE GENERATOR

Robert B. Trousdale, Rochester, N. Y., assignor to Stromberg-Carlson Company, a corporation of New York Application January 11, 1949, Serial No. 70,253

8 Claims. (Cl. 250—36)

Figure 2:
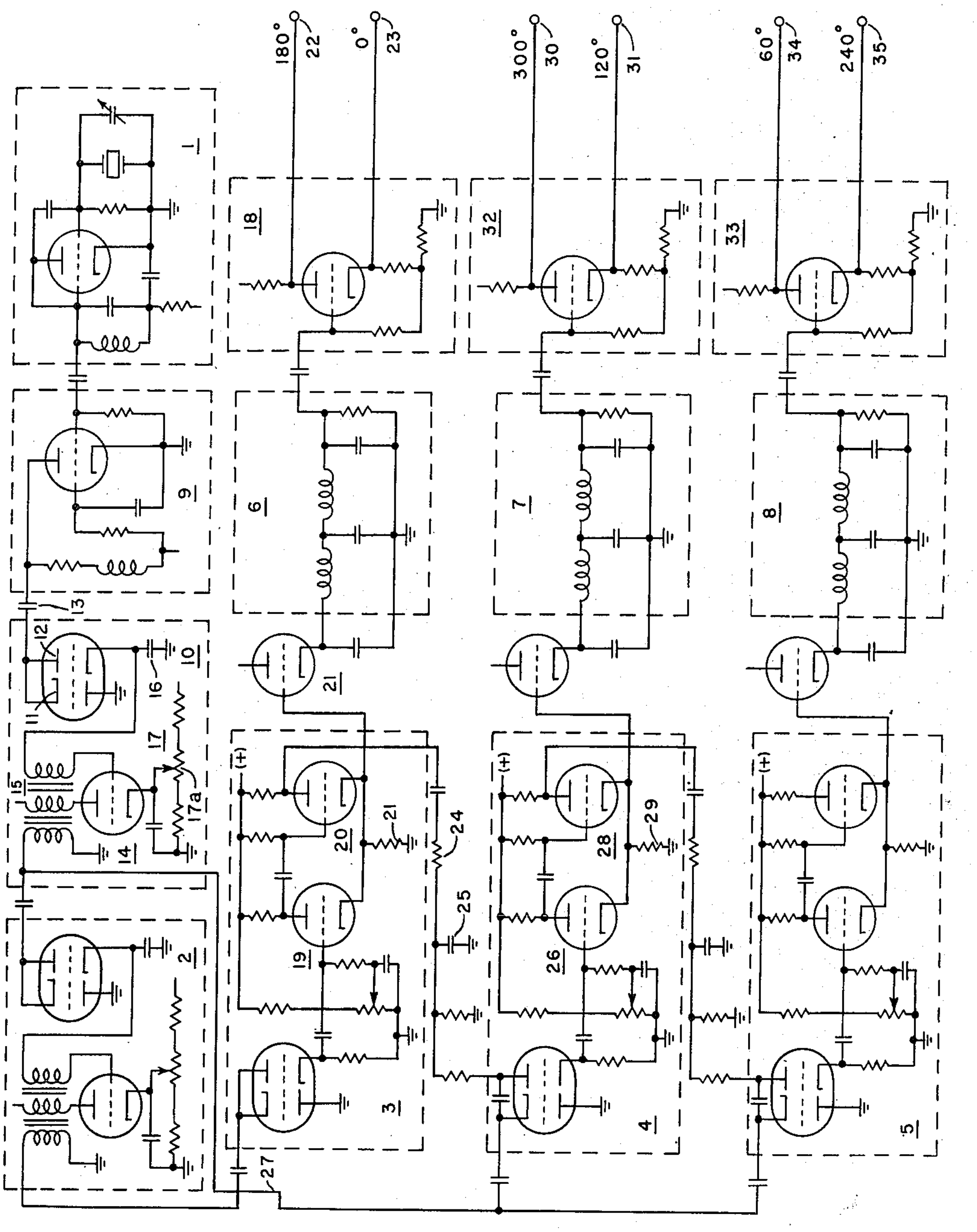

This invention relates to multiphase generators, and it is an object of my invention to provide a new and improved type of multiphase generator employing electron discharge devices.

The features of my invention which I believe to be novel are set forth with particularity in the appended claims. My invention itself, both as to its organization and manner of operation, together with further objects and advantages thereof, may best be understood by reference to the following description taken in connection with the accompanying drawing in which Fig. 1 is a block diagram illustrating the principles of my invention, Fig. 2 is a schematic diagram illustrating a six-phase generator embodying the principles of my invention, and Fig. 3 is a chart illustrating representative conditions pertaining during the operation of my device and which is believed helpful in understanding the application of my invention.

Referring to Fig. 1, there is illustrated a suitable source of rectangular or square pulses 1. There is provided one square wave generator for each phase or pair of phases desired to be developed according to whether the desired output has an odd or an even number of phases. Fig. 1 is suitable for three-phase supply and accordingly there are provided square wave generators 3, 4, and 5 of suitable type. These square wave generators are arranged to operate in turn. In order to enable this mode of operation, square wave generators 4 and 5 are prepared for operation by pulses obtained from source 1. Thus, means is provided for applying the pulses to all but one of the square wave generators. The source of pulses 1 is utilized for developing a second set of pulses occurring at the desired frequency. Such means may comprise a suitable frequency divider 2, the output of frequency divider 2 being employed to key the aforesaid one generator, i. e., square wave generator 3. The output of square wave generator 3 is applied to the input of square wave generator 4 whereby the applied source pulses as well as the output of the first square wave generator 3 are used to key square wave generator 4, and the applied source pulses and the output of square wave generator 4 are utilized to key square wave generator 5. Thus, there is provided means utilizing the applied pulses and the outputs of the respective square wave generators for successively keying the other generators at predetermined times. The frequency of the pulses appearing in the output of source 1 is equal to the desired frequency multiplied by the number of phases desired if an odd number of phases is required and the frequency of the source should be equal to the desired frequency multiplied by one half the number of desired phases if an even number of phases is desired. The outputs of the square wave generators 3, 4 and 5 are passed through low pass filter circuits 6, 7 and 8, respectively, to modify the generator outputs to sine wave outputs.

Fig. 2 is a schematic diagram of one embodiment of a multiphase generator incorporating the principles of my invention and designed to provide a six-phase output. There is disclosed a source of pulses such as the crystal controlled master oscillator 1 arranged to provide a sine wave output at a suitable frequency such as 81 kilocycles for example. The sine wave output is suitably shaped and limited, i. e., squared, by a suitable square wave amplifier 9, the output of which is impressed upon two frequency dividing or step counting circuits 10 and 2, these being connected in cascade. Each dividing circuit may comprise a single-swing blocking oscillator and a positive counter comprising two diode paths 11 and 12. The diode paths may be separate diodes or the two may be included in a single envelope, as for example a type 6H6 tube. One of the diodes is connected between the input coupling capacitor, as capacitor 13 for example, and ground, the cathode of diode path 11 being connected to the output side of capacitor 13 and the anode of diode path 11 being connected to ground. The anode of diode path 12 is also connected to the output side of capacitor 13 and the cathode of diode 12 is connected to the grid of blocking oscillator discharge device 14 through a winding of the transformer 15. The cathode of diode 12 is also connected to ground through a suitable capacitor 16.

Positive pulses developing in the output of square wave amplifier 9 are impressed upon the grid of device 14 through diode 12. Each pulse serves to increase the charge on capacitor 16 as long as there is no discharge path for capacitor 16. The blocking oscillator is triggered into operation when the grid potential of discharge device 14 reaches a sufficient value to raise the grid to the cutoff level. Once conduction starts, the grid swings positive with respect to its cathode and the resulting flow of grid current discharges capacitor 16. Any attempt of capacitor 16 to charge in the negative direction is prevented by the clamping action of diodes 11 and 12. In order to determine the sub-multiple frequency of the dividers, i. e., the number of pulses required to charge capacitor 16 sufficiently to trigger tube 14, there is provided a suitable source of bias potential 17 which may include an adjustable potentiometer 17a.

In the present embodiment of my invention, potentiometer 17a is set to count three pulses, i. e., to divide by three. Hence, the output of the first divider 10 is 27 kilocycles. At this point, reference is made to Fig. 3. Fig. 3A represents the output of square wave amplifier 9 and Fig. 3B represents the pulses appearing in the output of the first divider 10. In order to simplify the drawing, Fig. 3 has been drawn on the basis of nine pulses per unit of time whereby Fig. 3B, as a result, shows three pulses in each unit of time. The second divider 2 similarly counts three pulses and then produces an output pulse as indicated in Fig. 3C. Under the assumption that oscillator 1 operates at 81 kilocycles, the output of the second divider is a series of pulses occurring at a frequency of 9 kilocycles.

The output of the second divider is utilized to develop two phases of output voltage 180° apart. The developing means comprises multivibrator 3, low pass filter 6, and a phase inverter 18 connected in cascade relationship. The multivibrator 3 comprises two electron discharge devices 19 and 20, respectively, of suitable type, the circuit being arranged such that device 20 is normally conducting or "on." The appearance of positive going pulses (from the second divider) triggers "on" the discharge device 19 and renders non-conducting discharge device 20. The resulting potential across common cathode resistor 21 constitutes the output of multivibrator 3 and the resulting square waves are impressed upon low pass filter 6 which is provided to convert the relatively square pulses to sine waves. The output of the filter is impressed upon a suitable phase inverter 18 in order to provide two voltages 180° out of phase. Fig. 3D represents the square waves appearing across resistor 21 and Fig. 3E represents the outputs appearing at output terminals 22 and 23. In order to reduce the loading effect of low pass filter 6 on multivibrator 3, there may be interposed a suitable cathode follower stage 21 between multivibrator 3 and low pass filter 6.

Pulses appearing on the anode of discharge device 20 of multivibrator 3 are utilized to prepare the second multivibrator 4 for operation. The positive-going square pulses appearing at the anode of discharge device 20, Fig. 3F, are integrated by a suitable resistance-capacitance circuit including resistor 24 and capacitor 25, the resulting waveform being indicated in Fig. 3G. The integrated wave is applied to the grid of discharge device 26 of multivibrator 4.

The output of the first dividing circuit 10 is also applied to the grid of discharge device 26 over conductor 27. The combined grid potential is represented in Fig. 3H. Referring to Fig. 3H, the first pulse does not trigger the multivibrator because the grid potential is still beyond cutoff. However, the second pulse raises the grid potential to cut off and discharge device 26 of multivibrator 4 becomes conducting and discharge device 28 is rendered non-conducting. The third pulse has no effect inasmuch as discharge device 26 is still conducting. The output pulses appearing across common cathode resistor 29 of multivibrator or square wave generator 4, are filtered in a suitable filter circuit 7 and a pair of outputs, 180° apart, is provided at terminals 30 and 31 after transmission through a suitable phase inverter circuit 32. With this arrangement, it is noted that the operation of multivibrator 4 is controlled by the operation of multivibrator 3.

Similarly the potential appearing at the anode of discharge device 28, Fig. 3K, is utilized to prepare square wave generator or multivibrator 5 for operation in the same manner as square wave generator 4 was prepared for operation. The sequence of operations taking place in the third channel comprising square wave generator 5, filter 8, and phase inverter 33 is indicated in Figs. 3L, M, N and O, the latter representing the relative voltages appearing at output terminals 34 and 35.

The foregoing illustrative arrangement provides six-phase power at 9 kilocycles, the oscillator frequency being nine times its desired frequency or 81 kilocycles. Similar results could have been obtained by omitting the first dividing circuit 10 and employing a source of potential which would provide a series of pulses occurring at a 27 kilocycle rate.

A similar arrangement may be followed for any desired number of phases by proper choice of frequency, number of dividing circuits, and number of square wave generators. If an even number of phases is to be provided, it is necessary only to provide half as many wave forming channels because inversion may be used. However, if an odd number of phases is desired, the phase inverting stages must be omitted and a separate channel of phase-shaping circuits must be provided for each phase desired.

When an even number of phases is to be provided the source frequency must be at least equal to the desired frequency multiplied by a number equal to one half the number of desired phases. If an odd number of phases is required the source of frequency must equal the desired frequency multiplied by the desired number of phases. If the source frequency is greater than the foregoing product, suitable provision must be made, as by inserting dividing circuits, to reduce the frequency to the correct value.

While I have shown and described a particular embodiment of my invention, it will be obvious to those skilled in the art that changes and modifications may be made without departing from my invention in its broader aspects. I, therefore, aim in the appended claims to cover all such changes and modifications as fall within the true spirit and scope of my invention.

I claim:

1. A multiphase generator comprising a plurality of square wave generators, a source of pulses, means for applying said pulses to all but one of said generators, means utilizing said pulses for developing a second series of pulses of the frequency of the desired alternating current output, means utilizing the last-mentioned pulses for keying said one generator, and means utilizing said applied pulses and the output of one of the other generators for successively keying the other generators at predetermined times.

2. A multiphase generator comprising a plurality of square wave generators, a source of pulses, means for applying said pulses to all but one of said generators, means utilizing said pulses for developing a second series of pulses of the frequency of the desired alternating current output, means utilizing the last-mentioned pulses for keying said one generator, and means utilizing said applied pulses and the output of one of the other generators for successively keying the other generators at predetermined times, the frequency of said source of pulses being equal to the desired output frequency multiplied by the number of desired phases.

3. A multiphase generator comprising a plurality of square wave generators, a source of pulses, means for applying said pulses to all but one of said generators, means utilizing said pulses for developing a second series of pulses of the frequency of the desired alternating current output, means utilizing the last-mentioned pulses for keying said one generator, and means utilizing said applied pulses and the output of one of the other generators for successively keying the other generators at predetermined times, the frequency of said source of pulses being equal to the desired output frequency multiplied by one half the number of desired phases.

4. A multiphase generator comprising a plurality of square wave generators, a source of pulses, means for applying said pulses to all but one of said generators, means utilizing said pulses for developing a second series of pulses of the frequency of the desired alternating current output, means utilizing the last-mentioned pulses for keying said one generator, means utilizing said applied pulses and the output of one of the other generators for successively keying the other generators at predetermined times, and low pass filter means connected to the output of each square wave generator.

5. A multiphase generator comprising a source of pulses, a plurality of pulse generators, the quantity thereof being determined by the number of phases to be developed, a frequency divider connected to said source of pulses, means connecting the output of said divider being connected to the input of one of said generators for keying said one generator to produce an output pulse for each input pulse, means connecting said source of pulses to the inputs of the remaining pulse generators in order to prepare said remaining generators for operation, and means connecting the outputs of all but the last of said remaining generators to the input of the next generator whereby said generators except the last are enabled to key each other in succession in the presence of coincident pulses from said source of pulses and the preceding generators.

6. A multiphase generator comprising a source of pulses, a plurality of pulse generators, the quantity thereof being determined by the number of phases to be developed, a frequency divider connected to said source of pulses, means connecting the output of said divider being connected to the input of one of said generators for keying said one generator to produce an output for each input pulse, means connecting said source of pulses to the inputs of the remaining pulse generators in order to prepare said remaining generators for operation, means connecting the outputs of all but the last of said remaining generators to the input of the next generator whereby said generators except the last are enabled to key each other in succession in the presence of coincident pulses from said source of pulses and the preceding generators, and means for filtering the output of each generator.

7. A multiphase generator comprising a source of pulses, a plurality of pulse generators, the quantity thereof being determined by the number of phases to be developed, a frequency divider connected to said source of pulses, means connecting the output of said divider being connected to the input of one of said generators for keying said one generator to produce an output for each input pulse, means connecting said source of pulses to the inputs of the remaining pulse generators in order to prepare said remaining generators for operation, and means connecting the outputs of all but the last of said remaining generators to the input of the next generator whereby said generators except the last are enabled to key each other in succession in the presence of coincident pulses from said source of pulses and the preceding generators, the frequency of said source of pulses being equal to the desired frequency multiplied by the number of phases desired.

8. A multiphase generator comprising a source of pulses, a plurality of pulse generators, the quantity thereof being determined by the number of phases to be developed, a frequency divider connected to said source of pulses, means connecting the output of said divider being connected to the input of one of said generators for keying said one generator to produce an output for each input pulse, means connecting said source of pulses to the inputs of the remaining pulse generators in order to prepare said remaining generators for operation, and means connecting the outputs of all but the last of said remaining generators to the input of the next generator whereby said generators except the last are enabled to key each other in succession in the presence of coincident pulses from said source of pulses and the preceding generators, the frequency of said source of pulses being equal to the desired frequency multiplied by one half of the number of desired phases.

ROBERT B. TROUSDALE.

REFERENCES CITED

The following references are of record in the file of this patent:

UNITED STATES PATENTS

| Number | Name | Date |
|---|---|---|
| 2,166,688 | Kell | July 18, 1939 |

FOREIGN PATENTS

| Number | Country | Date |
|---|---|---|
| 510,881 | Great Britain | Aug. 8, 1939 |

OTHER REFERENCES

Grosdoff, RCA Review, vol. 7, No. 3, September 1946, pp. 438–447.